March 25, 1969    W. L. WILSON    3,434,799
PROCESS FOR PREPARING PIGMENTARY TITANIUM DIOXIDE
Filed April 14, 1965

INVENTOR
WILLIAM L. WILSON

BY Chisholm and Spencer

ATTORNEYS

> United States Patent Office 3,434,799
Patented Mar. 25, 1969

3,434,799
PROCESS FOR PREPARING PIGMENTARY TITANIUM DIOXIDE
William L. Wilson, Barberton, Ohio, assignor to PPG Industries, Inc., a corporation of Pennsylvania
Continuation-in-part of application Ser. No. 190,140, Apr. 25, 1962. This application Apr. 14, 1965, Ser. No. 448,121
Int. Cl. C01g 23/04
U.S. Cl. 23—202        11 Claims

ABSTRACT OF THE DISCLOSURE

The preparation of pigmentary titanium dioxide by vapor phase oxidation of titanium tetrahalide is described. A process for improving the pigmentary properties of the pigment by conducting the oxidation reaction in the presence of additives, particularly silicon and potassium is discussed.

CROSS-REFERENCE TO RELATED APPLICATIONS

Figure 1:
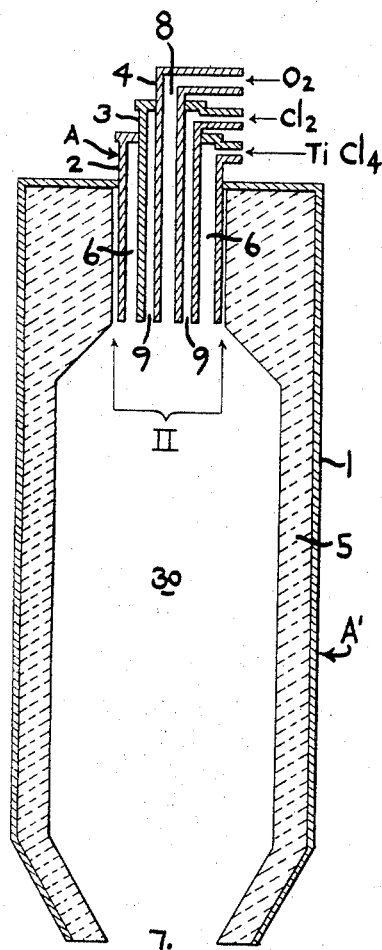

This application is a continuation-in-part of U.S. application Ser. No. 190,140, filed Apr. 25, 1962, now U.S. Letters Patent 3,214,284.

This invention relates to a process for producing pigmentary titanium dioxide having superior optical properties by the vapor phase oxidation of a titanium tetrahalide selected from the group consisting of titanium tetrachloride, titanium tetraiodide, and titanium tetrabromide.

Titanium dioxide is currently produced commercially by at least two different basic processes, the so-called sulfate process and the chloride process. The latter involves the vapor phase reaction of titanium tetrahalide and an oxygenating gas at a temperature of at least 800° C., usually 1000 to 1400° C., in the absence or presence of a fluidized bed, e.g., as disclosed in U.S. Letters Patent 2,964,386, U.S. Letters Patent 2,240,343, issued to Muskat, U.S. Letters Patent 2,394,633, issued to Pechukas et al., or U.S. Letters Patents 2,968,529 and 3,069,281, issued to William L. Wilson. The oxygenating gas may comprise any oxidizing or oxygenating agent, such as oxygen, air, oxides of nitrogen, $H_2O_2$, oxides of phosphorus, or mixtures of same.

Pigmentary titanium dioxide has unique optical properties which make it useful, particularly in the paint industry. Such optical properties, for example, tinting strength and undertone, are a function of particle size, dispersion and color. Pigmentary titanium dioxide of a given particle size distribution range, e.g., mean diameter of 0.2 to 0.5 micron, may be prepared by the vapor phase oxidation processes of Muskat, Pechukas, or Wilson, noted hereinbefore, as well as by other processes, e.g., Canadian Patent 517,816, issued to Krchma et al., or British patent specifications 876,672 and 922,671.

However, it has been discovered that the surface activity of the titanium dioxide particles produced by the aforementioned processes may be such that electrostatic charges or forces are set up between individual particles whereby the particles come together and combine in groups of two or more. Such grouping is termed chaining or aggregation. The result of such grouping, chaining, or aggregation is a deficient pigment having less than optimum dispersibility and decreased optical properties, particularly undertone.

It has been discovered that if titanium dioxide is prepared in accordance with the present invention, there is produced a pigmentary titanium dioxide particle having optimum dispersion and undertone for a given particle size distribution range. More particularly, there is produced a raw, uncoated pigmentary titanium dioxide particle having high, superior dispersion, a tinting strength of at least 1500, usually at least 1700, and a blue undertone (tint tone) for a particle size distribution range below 1.0 micron, preferably, 0.2 to 0.5 micron.

In the practice of this invention, it has been discovered that the pigmentary and optical properties, particularly undertone (tint tone), of rutile titanium dioxide pigment can be substantially increased by reacting the titanium tetrahalide with an oxygenating gas in the vapor phase in the presence of a silicon source or additive selected from the group consisting of metallic silicon and a silicon compound and a further source which will provide at least one ion selected from the group consisting of potassium, zinc, rubidium, and cesium.

Figure 3:
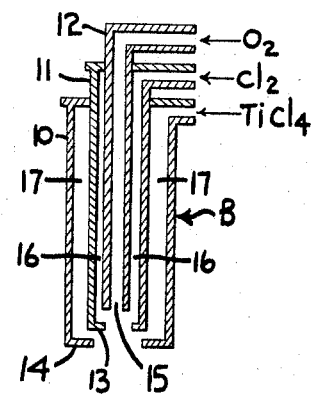
Figure 2:
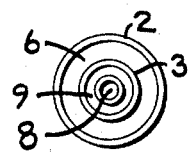

To more specifically describe the process of this invention, reference is made to the drawing, and FIGURES 1 to 3, inclusive which depict apparatus for practicing the process invention.

FIGURE 1 describes a diagrammatic cross-section view of a concentric orifice-annulus burner fitted in a furnace.

FIGURE 2 further illustrates the construction of the burner of FIGURE 1, representing a view along line I—I of FIGURE 1.

FIGURE 3 illustrates a diagrammatic cross-section view of a burner which may be fitted in the furnace of FIGURE 1 to produce pigmentary titanium dioxide according to the process of this invention.

Referring to FIGURES 1 and 2, reaction zone chamber of furnace A' comprises a concentric steel shell 1 and an internal lining of firebrick 5 (or other heat resistant insulation). At the lower part of furnace A' is a conical bottom terminating at outlet 7. At the upper part of furnace A' is a burner A.

Burner A is composed of three concentric tubes, 2, 3, and 4. Tube 3 is arranged so as to circumscribe tube 4 (forming annulus 6) and tube 2 is arranged so as to circumscribe tubes 3 and 4 (forming annulus 9). Each of the tubes 2 and 3 are evenly spaced from the wall of the tube it circumscribes. This is more clearly shown in FIGURE 2, which shows the tube arrangement taken along line I—I of FIGURE 1.

In the operation of the reactor of FIGURES 1 and 2, an oxygenating gas typically preheated 900° C. to 1750° C. is fed to the upper opening in tube 4, while an inert gas at room temperature up to the temperature of the oxygenating gas is fed to the opening at the top of tube 3. The inert gas may comprise chlorine, nitrogen, bromine, iodine, argon, helium, krypton, xenon, carbon dioxide, or mixtures thereof. Concurrently therewith, titanium tetrahalide is fed to the opening at the upper part of tube 2. The titanium tetrahalide has a temperature of 140° C. to about 1200° C.

Referring to FIGURE 3, burner B, which may be fitted in furnace A' of FIGURE 1 in replacement of burner A, is composed of three concentric tubes annularly arranged. Central oxygenating gas tube 12 is circumscribed by tube 11, which in turn is circumscribed by tube 10 such that there is formed annuli 17 and 16. Tube 11 is provided with an annular lip 13, at its lower end and tube 10 is provided with annular lip 14, such that the titanium tetrahalide and inert gas streams are emitted from the annuli 17 and 16 in a direction substantially perpendicular to the direction of flow of the oxygenating gas from tube 12. In operation, burner B is fed in the same manner as burner A of FIGURE 1.

The silicon source or additive and the selected ion of potassium, zinc, rubidium, and cesium can be added together or separately to the inert stream or added together or separately in one of the reactants, e.g., titanium tetrahalide or oxygenating gas.

When the process is operated in accordance with U.S. Letters Patents 3,069,282 and 3,105,742 and a combustible carbon-containing or sulfur-containing fuel is fed into the reaction zone 30, the silicon source and selected ion can also be introduced separately or together directly to the reaction zone 30 independently of the inert stream, reactants, and combustible fuel.

Thus, in the practice of this invention, the silicon source can be added directly to the reaction zone 30 or incorporated with one or more streams of inert gas, reactants, or fuels being fed to the zone. Likewise, the selected ion of potassium, zinc, rubidium, and cesium can be added directly to the zone 30 or incorporated with one or more streams being fed to the zone. The selected ion may be added separately or in conjunction with the silicon source.

The silicon source and the selected ion additives can be added directly to the reaction zone as an atomized spray in a solid, liquid, or gaseous state.

Furthermore, such additives may be added to the zone by employing an inner furnace wall 5 constructed of a ceramic or firebrick material which contains either one or both of the silicon and ion additives. Such material is gradually eroded into the reaction zone due to the high temperature oxidation environment in zone 30, as noted for example in British patent specification 672,753.

One or both of the additives may also be introduced into the reaction zone by employing a ceramic dedusting edge, as disclosed in copending U.S. application Ser. No. 379,825, filed July 2, 1964, which contains a source of the ion and/or silicon, e.g., a lava stone containing about 0.5 to 1.5 percent by weight potassium.

Such additives are further introduced by employing a baffle, as disclosed in copending U.S. application Ser. No. 376,980, filed June 22, 1964, now U.S. Patent 3,382,042, which is constructed out of a silicon or selected ion containing material.

The silicon source is added to the process in an amount sufficient to insure the presence of 0.01 to 8.0 percent by weight $SiO_2$, basis the weight of the $TiO_2$, in the reaction zone.

The selected metallic ion source of potassium, zinc, rubidium, and cesium is added to the process in an amount sufficient to insure the presence of 0.00001 to 4.0, preferably 0.001 to 0.1, percent by weight of the selected ion in the reaction zone, basis the weight of the $TiO_2$.

Silicon source as employed herein defined as any compound of silicon (including metallic silicon) which will oxidize to silica ($SiO_2$) at a temperature of 1500° C. or less.

Specific silicon compounds envisioned not by way of limitation are the silicon hydrides or silanes such as $SiH_4$ (monosilane),
$Si_2H_6$ (disilane),
$Si_3H_8$ (trisilane),
$Si_4H_{10}$ (tetrasilane),
$Si_5H_{12}$ (pentasilane),
$Si_6H_{14}$ (hexasilane),
$Si_7H_{16}$,
$Si_8H_{18}$,
$Si_9H_{20}$,
$Si_{10}H_{22}$;
alkylsilanes such as
$CH_3SiH_3$ (monomethylsilane),
$(CH_3)_2SiH_2$ (dimethylsilane),
$(CH_3)_3SiH$ (trimethylsilane),
$C_2H_5SiH_3$ (monoethylsilane),
$(C_2H_5)_2SiH_2$ (diethylsilane),
$(C_2H_5)_3SiH$ (triethylsilane),
$(CH_3)_4Si$ (silicon tetramethyl),
$(C_2H_5)_4Si$ (silicon tetraethyl),
$C_3H_7SiH_3$,
$(C_3H_7)_2SiH_2$,
$(C_3H_7)_3SiH$,
$(C_3H_7)_4Si$ (silicon tetrapropyl),
$C_4H_9SiH_3$,
$(C_4H_9)_2SiH_2$,
$(C_4H_9)_3SiH$,
$(C_4H_9)_4Si$ (silicon tetrabutyl),
$C_5H_{11}SiH_3$,
$(C_5H_{11})_2SiH_2$,
$(C_5H_{11})_3SiH$,
$(C_5H_{11})_4Si$ (silicon tetraisoamyl),
$C_6H_{13}SiH_3$,
$(C_6H_{13})_2SiH_2$,
$(C_6H_{13})_3SiH$,
$(C_6H_{13})_4Si$,
$C_7H_{15}SiH_3$,
$(C_7H_{15})_2SiH_2$,
$(C_7H_{15})_3SiH$,
$(C_7H_{15})_4Si$,
$(C_6H_5)_4Si$ (silicon tetraphenyl),
$(C_7H_7)_4Si$ (silicon tetra-m-tolyl or tetra-p-tolyl),
$(C_6H_5CH_2)_4Si$ (silicon tetrabenzyl),
$(C_{12}H_9)_4Si$ (silicon tetraxenyl),
$(CH_3)_3C_6H_5Si$ (trimethylphenylsilane),
$(CH_3)_2(C_6H_5)_2Si$ (dimethyldiphenylsilane),
$CH_3(C_6H_5)_3Si$ (methyltriphenylsilane),
$(C_2H_5)_3C_6H_5Si$ (triethylphenylsilane),
$(C_2H_5)_2(C_6H_5)_2Si$ (diethyldiphenylsilane),
$C_2H_5(C_6H_5)_3Si$ (ethyltriphenylsilane),
$(CH_3)(C_2H_5)(n-C_3H_7)(C_6H_5)Si$ (methylethylpropylphenylsilane),
$(C_2H_5)(n-C_3H_7)(i-C_4H_9)(CH_2C_6H_5)Si$ (ethyl-n-propyl-i-butylbenzylsilane),
$(C_6H_5)_3SiH$ (triphenylsilane),
$(C_6H_5CH_2)_3SiH$ (tribenzylsilane);
organosilicon halides or alkylhalosilanes such as
$CH_3SiH_2Cl$,
$CH_3SiHCl_2$,
$CH_3SiCl_3$,
$CH_2ClSiH_3$,
$CHCl_2SiH_3$,
$CCl_3SiH_3$,
$CHCl_2SiH_2Cl$,
$CH_2ClSiHCl_2$,
$CH_2ClSiH_2Cl$,
$C_2H_5SiH_2Cl$,
$C_2H_5SiHCl_2$,
$C_2H_5SiCl_3$,
$C_2H_7SiH_2Cl$,
$C_3H_7SiHCl_2$,
$C_3H_7SiCl_3$;
silicon halides such as $SiCl_4$ (silicon tetrachloride),
$SiBr_4$ (silicon tetrabromide),
$SiI_4$ (silicon tetraiodide),
$SiF_4$ (silicon tetrafluoride),
$SiH_3Cl$ (monochlorosilane),
$SiH_2Cl_2$ (dichlorosilane),
$SiHCl_3$ (trichlorosilane),
$SiH_3Br$ (monobromosilane),
$SiH_2Br_2$ (dibromosilane),
$SiHBr_3$ (tribromosilane),
$SiH_3I$ (monoiodosilane),
$SiH_2I_2$ (diiodosilane),
$SiHI_3$ (triiodosilane),
$SiH_3F$ (monofluorosilane),
$SiH_2F_2$ (difluorosilane),
$SiHF_3$ (trifluorosilane),
$SiCl_2$ (silicon dichloride),
$SiBr_2$ (silicon dibromide) $SiI_2$ (silicon diiodide),
$SiF_2$ (silicon difluoride),
$Si_2Cl_6$ (silicon trichloride),
$Si_2Br_6$ (silicon tribromide),
$Si_2I_6$ (silicon triiodide),
$Si_2F_6$ (silicon trifluoride),
$SiICl_3$ (silicon iodotrichloride),
$SiI_2Cl_2$ (silicon iododichloride),
$SiBrCl_3$ (silicon bromotrichloride),
$SiBr_2Cl_2$ (silicon bromodichloride),
$SiFCl_3$ (silicon fluorotrichloride),
$SiF_2Cl_2$ (silicon fluorodichloride), Si₃Cl₈, SiClI₃, Si₃Cl₅I₃,
Si₃Br₈, SiFI₃, Si₃Cl₄I₄,
Si₃I₈, SiF₂I₂, Si₃Cl₅I₃,
Si₃F₈, SiIF₃, Si₃Cl₆I₂,
Si₄Cl₁₀, SiClF₃, Si₃ClI₇,
Si₄Br₁₀, SiBrF₃, Si₃F₇Br,
Si₄I₁₀, Si₃Cl₇F, Si₃F₆Br₂,
Si₄F₁₀, Si₃Cl₆F₂, Si₃F₅Br₃,
Si₅Cl₁₂, Si₃Cl₅F₃, Si₃F₄Br₄,
Si₅Br₁₂, Si₃Cl₄F₄, Si₃F₅Br₃,
Si₅I₁₂, Si₃Cl₃F₅, Si₃F₆Br₂,
Si₅F₁₀, Si₃Cl₂F₆, Si₃F₇Br,
Si₆Cl₁₄, Si₃ClF₇, Si₃F₇I,
Si₆Br₁₄, Si₃Cl₇I, Si₃F₆I₂,
Si₆I₁₄, Si₃Cl₆I₂, Si₃F₅I₃,
Si₆F₁₄, Si₃Cl₅I₃, Si₃F₄I₄,
SiIBr₃, Si₃Cl₄I₄, Si₃F₅I₃,
SiI₂Br₂, Si₃Cl₃I₅, Si₃F₆I₂,
SiFBr₃, Si₃Cl₂I₆, SiF₇I,
SiF₂Br₂, SiClI₇, Si₃Br₇I,
SiClBr₃, Si₃Cl₇Br, Si₃Br₆I₂,
SiBrI₃, Si₃Cl₆Br₂, Si₃Br₅I₃,
Si₃Br₄I₄, Si₄Br₈F₂, Si₅Cl₈I₄,
Si₃Br₃I₅, Si₄Br₇F₃, Si₅Cl₇I₅,
Si₃Br₂I₆, Si₄Br₆F₄, Si₅Cl₆I₆,
Si₃BrI₇, Si₄Br₅F₅, Si₅Cl₅I₇,
Si₄Cl₉I, Si₄Br₄F₆, Si₅Cl₄I₈,
Si₄Cl₈I₂, Si₄Br₃F₇, Si₅Cl₃I₉,
Si₄Cl₇I₃, Si₄Br₂F₈, Si₅Cl₂I₁₀,
Si₄Sl₆I₄, Si₄BrF₉, Si₅ClI₁₁,
Si₄Cl₅I₅, Si₄I₉F, Si₅Br₁₁I,
Si₄Cl₄I₆, Si₄I₈F₂, Si₅Br₁₀I₂,
Si₄Cl₃I₇, Si₄I₇F₃, Si₅Br₉I₃,
Si₄Cl₂I₈, Si₄I₆F₄, Si₅Br₈I₄,
Si₄ClI₉, Si₄I₅F₅, Si₅Br₇I₅,
Si₄Cl₉Br, Si₄I₄F₆, Si₅Br₆I₆,
Si₄Cl₈Br₂, Si₄I₃F₇, Si₅Br₅I₇,
SiCl₇Br₃, Si₄I₂F₈, Si₅Br₄I₈,
Si₄Cl₆Br₄, Si₄IF₉, Si₅Br₃I₉,
Si₄Cl₅Br₅, Si₅Cl₁₁Br, Si₅Br₂I₁₀,
Si₄Cl₄Br₆, Si₅Cl₁₀Br₂, Si₅BrI₁₁,
Si₄Cl₃Br₇, Si₅Cl₉Br₃, Si₅Br₁₁F,
Si₄Cl₂Br₈, Si₅Cl₈Br₄, Si₅Br₁₀F₂,
Si₄ClBr₉, Si₅Cl₇Br₅, Si₅Br₉F₃,
Si₄Cl₉F, Si₅Cl₆Br₆, Si₅Br₈F₄,
Si₄Cl₈F₂, Si₅Cl₅Br₇, Si₅Br₇F₅,
Si₄Cl₇F₃, Si₅Cl₄Br₈, Si₅Br₆F₆,
Si₄Cl₆F₄, Si₅Cl₃Br₉, Si₅Br₅F₇,
Si₄Cl₅F₅, Si₅Cl₂Br₁₀, Si₅Br₄F₈,
Si₄Cl₄F₆, Si₅ClBr₁₁, Si₅Br₃F₉,
Si₄Cl₃F₇, Si₅Cl₁₁F, Si₅Br₂F₁₀,
Si₄Cl₂F₈, Si₅Cl₁₀F₂, Si₅BrF₁₁,
Si₄ClF₉, Si₅Cl₉F₃, Si₅I₁₁F,
Si₄Br₉I, Si₅Cl₈F₄, Si₅I₁₀F₂,
Si₄Br₈I₂, Si₅Cl₇F₅, Si₅I₉F₃,
Si₄Br₇I₃, Si₅Cl₆F₆, Si₅I₈F₄,
Si₄Br₆I₄, Si₅Cl₅F₇, Si₅I₇F₅,
Si₄Br₅I₅, Si₅Cl₄F₈, Si₅I₆F₆,
Si₄Br₄I₆, Si₅Cl₃F₉, Si₅I₅F₇,
Si₄Br₃I₇, Si₅Cl₂F₁₀, Si₅I₄F₈,
Si₄Br₂I₈, Si₅ClF₁₁, Si₅I₃F₉,
Si₄BrI₉, Si₅Cl₁₁I, Si₅I₂F₁₀,
Si₄Br₉F, Si₅Cl₁₀I₂, Si₅IF₁₁;
 Si₅Cl₉I₃, alkylalkoxysilanes or alkylsilicic esters (or ethers) such as (CH₃)₃SiOH (trimethylsilanol),
(C₂H₅)₃SiOH (triethylsilanol),
(n-C₃H₇)₃SiOH (triopropylsilanol),
(i-C₅H₁₁)₃SiOH (tri-i-amylsilanol),
(C₆H₅)₃SiOH (triphenylsilanol),
(p-C₇H₇)₃SiOH (tri-p-tolylsilanol),
(C₆H₅CH₂)₃SiOH (tribenzylsilanol),
(CH₃)(C₂H₅)(C₆H₆)SiOH (methylethylphenylsilanol),
(C₂H₅)₂(C₆H₅)SiOH (diethylphenylsilanol,
(C₂H₅)(n-C₃H₇)(C₆H₅)SiOH (ethylpropylphenylsilanol),
CH₃(C₆H₅CH₂)₂SiOH (methyldibenzylsilanol),
C₂H₅(C₆H₅CH₂)₂SiOH (ethyldibenzylsilanol),
(C₂H₅)₂(C₆H₅CH₂)SiOH (diethylbenzylsilanol),
(C₂H₅)(n-C₃H₇)(C₆H₅CH₂)SiOH (ethylpropylbenzylsilanol),
(C₂H₅)(i-C₄H₉)(C₆H₅CH₂)SiOH,
(ethyl-i-butylbenzylsilanol),
(C₆H₅)₂Si(OH)₂ (diphenylsilanediol),
(C₆H₅CH₂)₂Si(OH)₂ (dibenzylsilanediol),
C₂H₅(C₆H₅)Si(OH)₂ (ethylphenylsilanediol),
C₂H₅(C₆H₅CH₂)Si(OH)₂ (ethylbenzylsilanediol),
(CH₃)₃SiOCH₃ (trimethylmethoxysilane),
(CH₃)₃SiOC₂H₅ (trimethylethoxysilane),
(CH₃)₃SiOC₄H₉ (trimethylbutoxysilane),
(CH₃)₂Si(OC₂H₅)₂ (dimethyldiethoxysilane),
(CH₃)₂Si(OC₄H₉)₂ (dimethyldibutoxysilane),
(C₂H₅)₂Si(OC₂H₅)₂ (diethyldiethoxysilane),
(C₆H₅C≡C)₂Si(OC₂H₅)₂ (diphenylethyldiethoxysilane),
CH₃Si(OC₂H₅)₃ (methyltriethoxysilane),
CH₃Si(OC₄H₉)₃ (methyltributoxysilane),
C₂H₅Si(OCH₃)₃ (ethyltrimethoxysilane),
C₂H₅Si(OC₂H₅)₃ (ethyltriethoxysilane),
i-C₃H₇Si(OC₂H₅)₃ (isopropyltriethoxysilane),
i-C₄H₉Si(OC₂H₅)₃ (isobutyltriethoxysilane),
i-C₅H₁₁Si(OC₂H₅)₃ (isoamyltriethoxysilane),
C₆H₁₃Si(OC₂H₅)₃ (hexyltriethoxysilane),
C₃H₅Si(OC₂H₅)₃ (allyltriethoxysilane),
C₆H₅Si(OC₂H₅)₃ (phenyltriethoxysilane),
C₆H₅Si(OC₆H₅)₃ (phenyltriphenoxysilane),
C₆H₅CH₂Si(OC₂H₅)₃ (benzyltriethoxysilane),
C₆H₅C≡C—Si(OC₂H₅)₃ (trimethylbutoxysilane),
Si(OC₂H₅)₄ (ethyl silicate),
HSi(OC₂H₅)₃,
H₂Si(OC₂H₅)₂,
H₃Si(OC₂H₅),
Si(OCH₃)₄ (methyl silicate),
HSi(OCH₃)₃,
H₂Si(OCH₃)₂,
H₃Si(OCH₃),
Si(OC₃H₇)₄,
HSi(OC₃H₇)₃,
H₂Si(OC₃H₇)₂,
H₃Si(OC₃H₇),
Si(OC₄H₉)₄,
HSi(OC₄H₉)₃,
H₂Si(OC₄H₉)₂,
H₃Si(OC₄H₉),
Si(OC₆H₁₃)₄,
HSi(OC₆H₁₃)₃,
H₂Si(OC₆H₁₃)₂,
H₃Si(OC₆H₁₃),
(SiH₃)₂ (disiloxane),
(SiCl₃)₂O (hexachlorodisiloxane),
(SiBr₃)₂O (hexabromodisiloxane),
Si(OC₆H₅)₄ (phenylsilicate),
Si(OC₅H₁₁)₄ (amyl silicate),
Si(OC₇H₇)₄ (benzylsilicate),
(CH₃O)₆Si₂O (hexamethoxydisiloxane),
(C₂H₅O)₆Si₂O (hexaethoxydisiloxane).

The silicon source may also include H₂SiO₃ (meta silicic acid),
H₄SiO₄ (ortho silicic acid),
SiHBr₃ (silico bromoform),
SiHCl₃ (silico chloroform),
SiHF₃ (silico fluoroform),
SiHI₃ (silico iodoform),
Si₂O₂(OH)₂ (silico oxalic acid),
SiB₃ (silicon triboride),
SiB₆ (silicon hexaboride),
Si₂Br₆ (silicon tribromide),
(C₂H₅)₂(C₆H₅)₂Si (diethyldiphenylsilane), C₂H₅(C₆H₆)₃Si (ethyltriphenylsilane),
(CH₃)(C₂H₅)(n-C₃H₇)(C₆H₅)Si
 methylethylpropylphenylsilane),
(C₂H₅)(n-C₃H₇)(i-C₄H₉)(CH₂C₆H₅)Si
 (ethyl-n-propyl-i-butylbenzylsilane),
(C₂H₅)₃SiF (triethylfluorosilane),
(n-C₃H₇)₃SiF (tripropylfluorosilane),
(n-C₄H₉)₃SiF (tributylfluorosilane),
(n-C₅H₁₁)₃SiF (triamylfluorosilane),
(C₆H₅)₃SiF (triphenylfluorosilane),
(C₆H₅CH₂)₃SiF (tribenzylfluorosilane),
(CH₃)₃SiCl (trimethylchlorosilane),
(CH₃)₃SiBr (trimethylbromosilane),
(C₂H₅)₃SiCl (triethylchlorosilane),
(C₂H₅)₃SiBr (triethylbromosilane),
(n-C₃H₇)₃SiBr (tripropylbromosilane),
(i-C₄H₉)₃SiBr (triisobutylbromosilane),
(i-C₅H₁₁)₃SiBr (triisoamylbromosilane),
(C₆H₅)₃SiCl (triphenylchlorosilane),
(C₆H₅)₃SiCl (triphenylchlorosilane),
(C₆H₅)₃SiBr (triphenylbromosilane),
(p-C₇H₇)₃SiCl (tri-p-tolylchlorosilane),
(C₆H₅CH₂)₃SiCl (tribenzylchlorosilane),
(CH₂=CHCH₂)(CH₃)₂SiCl (allyldimethylchlorosilane),
C₂H₅(C₆H₅)₂SiCl (ethyldiphenylchlorosilane),
(C₆H₅)(C₂H₅)(n-C₃H₇)SiCl
 (phenylethylpropylchlorosilane),
(C₆H₅CH₂)(C₂H₅)(n-C₃H₇)SiCl
 (benzylethylpropylchlorosilane),
(C₆H₅CH₂)(C₂H₅)(i-C₄H₉)SiCl
 (benzylethyl-i-butylchlorosilane),
(CH₃)₂SiBr₂ (dimethyldibromosilane),
(CH₃)₂SiCl₂ (dimethyldichlorosilane),
(C₂H₅)₂SiCl₂ (diethyldichlorosilane),
(CH₂=CH)₂SiCl₂ (divinyldichlorosilane),
(n-C₃H₇)₂SiCl₂ (dipropyldichlorosilane),
CH₂=CHCH₂SiHCl₂ (allyldichlorosilane),
(CH₂=CHCH₂)₂SiCl₂ (diallyldichlorosilane),
(C₆H₅)₂SiCl₂ (diphenyldichlorosilane),
(p-BrC₆H₄)₂SiCl₂ (di-p-bromophenyldichlorosilane),
(C₆H₅)₂SiBr₂ (diphenyldibromosilane),
(p-C₇H₇)₂SiCl₂ (di-p-tolyldichlorosilane),
(C₆H₅CH₂)₂SiCl₂ (dibenzyldichlorosilane),
(CH₂=CH)(CH₃)SiCl₂ (vinylmethyldichlorosilane),
(CH₂=CHCH₂)(CH₃)SiCl₂ (allylmethyldichlorosilane),
C₂H₅(n-C₃H₇)SiCl₂ (ethylpropyldichlorosilane),
C₂H₅(i-C₄H₉)SiCl₂ (ethylisobutyldichlorosilane),
C₂H₅(C₆H₅)SiCl₂ (ethylphenyldichlorosilane),
C₂H₅(C₆H₅CH₂)SiCl₂ (ethylbenzyldichlorosilane),
C₆H₅(C₆H₅CH₂)SiCl₂ (phenylbenzyldichlorosilane),
C₆H₅(p-BrC₆H₄)SiCl₂
 (phenyl-p-bromophenyldichlorosilane),
CH₃SiCl₃ (methyltrichlorosilane),
CH₃SiCl₃ (methyltrichlorosilane),
C₂H₅SiCl₃ (ethyltrichlorosilane),
CH₂=CH—SiCl₃ (vinyltrichlorosilane),
n-C₃H₇SiCl₃ (propyltrichlorosilane),
CH₂=CHCH₂SiCl₃ (allyltrichlorosilane),
n-C₄H₉SiCl₃ (butyltrichlorosilane),
i-C₄H₉SiCl₃ (isobutyltrichlorosilane),
i-C₅H₁₁SiCl₃ (isoamyltrichlorosilane),
C₆H₅SiCl₃ (phenyltrichlorosilane),
C₆H₁₁SiCl₃ (cyclohexyltrichlorosilane),
p-C₇H₇SiCl₃ (p-tolyltrichlorosilane),
C₆H₅CH₂SiCl₃ (benzyltrichlorosilane),
a-C₁₀H₇SiCl₃ (a-naphthyltrichlorosilane),
CH₃SiBr₃ (methyltribromosilane),
(CH₃)₃SiOH,
(CH₃)₆Si₂ (hexamethyldisilane),
(C₂H₅)₆Si₂ (hexaethyldisilane),
(C₃H₇)₆Si₂ (hexa-n-propyldisilane),
(C₂H₅)₂(C₃H₇)₂(C₆H₅)₂Si₂
 (diethyldipropyldiphenyldisilane),
(C₂H₅)₂(C₃H₇)₂(C₇H₇)₂Si₂
 (diethyldipropyldibenzyldisilane),
(C₆H₅)₆Si₂ (hexaphenyldisilane),
(C₇H₇)₆Si₂ (hexa-p-tolyldisilane or hexabenzyldisilane),
—(C₆H₅)₈Si₄— (octaphenyltetrasilane),
[(C₆H₅)₂Si]₄ (cyclooctaphenyltetrasilane),
—(C₇H₇)₈Si₄— (octa-p-tolyltetrasilane),
[(p-C₇H₇)₂Si]₄ (cycloocta-p-tolyltetrasilane),
(C₃H₇)₆Si₂O (hexapropyldisiloxane),
(C₂H₅)₆Si₂O (hexaethyldisiloxane),
(CH₃)₆Si₂NH (hexamethyldisilazine),
(CH₃)₆Si₂O (hexamethyldisiloxane),
(C₇H₇)₈Si₄O,
(C₆H₅)₈Si₄O₂
 (cyclooctaphenyltetrasilane oxide or dioxide),
(C₆H₅O)₂(C₆H₅)₈Si₄,
(C₅H₁₁)₆Si₂O (hexaisoamyldisiloxane),
(C₆H₅)₆Si₂O (hexaphenyldisiloxane),
(C₇H₇)₆Si₂O (hexa-p-tolyldisiloxane),
(CH₃)₂(C₆H₅)₄Si₂O (dimethyltetraphenyldisiloxane),
(C₂H₅)₂(C₆H₅)₄Si₂O (diethyltetraphenyldisiloxane),
(C₂H₅)₂(n-C₃H₇)₂Si₂O
 (diethyldipropyldibenzyldisiloxane),
(C₂H₅)₂(i-C₄H₉)₂(C₇H₇)₂Si₂O
 (diethyldibutyldibenzyldisiloxane),
(C₆H₅)₄Si₂O(OH)₂ (tetraphenyldisiloxane-1,3-diol),
(C₆H₅)₆Si₃O₂(OH)₂ (hexaphenyltrisiloxane-1,5-diol),
(C₂H₅)₂(C₆H₅)₂Si₂O(OH)₂
 (diethyldiphenyldisiloxane-1,3-diol),
(C₇H₇)₄Si₂O(OH)₂ (tetrabenzyldisiloxane-1,3-diol),
(C₇H₇)₄Si₃O₂(OH)₂ (hexabenzyltrisiloxane-1,5-diol),
(Me₂SiO)₃ (hexamethylcyclotrisiloxane),
(Et₂SiO)₃ (hexaethylcyclotrisiloxane),
(C₆H₅)₆Si₃O₃ (hexaphenylcyclotrisiloxane),
(C₆H₅)₈Si₄O₄ (octaphenylcyclotetrasiloxane),
(C₇H₇)₆Si₃O₃ (hexabenzylcyclotrisiloxane),
(EtBzSiO)₃ (triethyltribenzylcyclotrisiloxane).

In addition, applicant incorporates herein by reference all of the silicon compounds listed on pages 166 to 195 of "Silicones and Other Organic Silicon Compounds," by Howard W. Post, Reinhold Publishing Corporation, New York (1949).

The potassium ion source can be elemental potassium or a potassium compound. Examples not by way of limitation of potassium compounds include both organic and inorganic compounds such as KHC₆H₈O₈ (potassium saccharate acid), KOC₆H₄NO₂·2H₂O (potassium-m-nitrophen oxide or potassium-p-nitrophen oxide), $$KHC_4H_4O_4 \cdot C_4H_6O_4$$

(potassium hydrogen succinate), K₂SO₄ (potassium sulfate), KHSO₄ (potassium hydrogen sulfate), K₂S₂O₇ (potassium pyrosulfate), K₂S₂O₈ (potassium peroxydisulfate), K₂S (potassium monosulfide), K₂S·5H₂O, KHS potassium hydrosulfide), K₂S₂ (potassium disulfide), $$K_2S_2 \cdot 3H_2O$$

K₂S₃ (potassium trisulfide), K₂S₄ (potassium tetra sulfide), K₂S₂·2H₂O, K₂S₅ potassium pentasulfide), $$K_2SO_3 \cdot 2H_2O$$

KHSO₃, K₂S₃O₅ (potassium pyrosulfite), $$K_2C_4H_4O_6 \cdot \tfrac{1}{2}H_2O$$

(potassium d-tartrate), K₂C₄H₄O₆, KHC₄H₄O₆ (potassium hydrogen d-tartrate), K₂H₄TeO₆·3H₂O (potassium orthotellurate), K₂CS₃ (potassium trithiocarbonate), KSCN (potassium thiocyanate), K₂S₂O₆ (potassium dithionate), K₂S₃O₆ (potassium trithionate), K₂S₄O₆ (potassium tetrathionate), 2K₂S₅O₆·3H₂O (potassium pentathionate), K₂SnS₃·3H₂O, 3K₂S₂O₃·H₂O (potassium thiosulfate), 3K₂S₂O₃·5H₂O, KHC₅H₂N₄O₃ (potassium acid urate), KC₂H₃O₂( potassium acetate), $$KC_2H_3O_2 \cdot HC_2H_3O_2$$

(potassium acid acetate), KC₉H₇O₄·2H₂O (potassium acetylsalicylate), KNH₂ (potassium amide),

KNH₄C₄H₄O₆

(potassium ammonium tartrate), KAuO₂·xH₂O, KN₃ (potassium azide), KC₇H₅O₂·3H₂O (potassium benzoate), K₂B₂H₆ (potassium diborane), K₂B₂H₆O₂ (potassium dihydoxy diborane), K₂B₅H₉ (potassium pentaborane), KBO₂ (potassium metaborate), K₂B₄O₇·8H₂O (potassium tetraborate), KB₅O₈·4H₂O (potassium pentaborate), KBO₃·½H₂O (potassium peroxyborate),

KC₄H₄BO₇

(potassium borotartrate), KBrO₃ (potassium bromate), KBr (potassium bromide), KAuBr₄, K₂CrO₄·2Cr(OH)CrO₄

(potassium chromium chromate, basic),

KCr(SO₄)₂·12H₂O (potassium chromium sulfate), K₃C₆H₅O₇·H₂O (potassium citrate), KH₂C₆H₅O₇ (potassium citrate, monobasic), KOCN (potassium cyanate), KCN (potassium cyanide), KC₂H₅SO₄ (potassium ethyl sulfate), K₂GeF₆ (potassium fluogermanate), K₂C₂₀H₁₀O₅ (potassium fluorescein derivative), KPF₆ (potassium hexafluorophosphate), KF (potassium fluoride), KF·2H₂O, KHF₂, K₂SiF₆ (potassium fluosilicate), KAu(CN)₂, KBF₄ (potassium fluoborate), K₂HPO₃ (potassium mono hydrogen orthophosphite), KH₂PO₃ (potassium di hydrogen orthophosphite), KHC₈H₄O₄ (potassium hydrogen phthalate), KC₆H₂N₃O₇ (potassium picarate), KC₁₂H₈O₄ (potassium piperate), KC₃H₅O₂·H₂O (potassium propionate),

KC₃H₇SO₄

(potassium propyl sulfate), KHC₆H₈O₈ (potassium acid d-saccharate), KC₇H₅O₃ (potassium salicylate),

KC₁₅H₁₉O₄

(potassium santoninate), K₂SiO₃ (potassium metasilicate), KHSi₂O₅ (potassium hydrogen disilicate),

KC₁₈H₃₅O₂

(potassium stearate), K₂C₄H₄O₄·3H₂O (potassium succinate), KHC₄H₄O₄ (potassium hydrogen succinate), KHC₄H₄O₄·2H₂O (potassium fluosulfonate), KFSO₃ K₂ThF₆·4H₂O (potassium fluothorate), K₂TiF₆·H₂O (potassium fluotitanate), K₂ZrF₆ (potassium fluozirconate), KCHO₂ (potassium formate), K₂C₃H₇PO₆ (potassium glycerophosphate), KH (potassium hydride), KOH (potassium hydroxide), KIO₃ (potassium iodate),

KIO₃·HIO₃

(potassium acid iodate), KIO₃·2HIO₃, KIO₄ (potassium metaperiodate), KI, KI₃ (potassium triiodide), KCl₃, KF, KF₃, KBr, KBr₃, KC₃H₅O₃·xH₂O (potassium lactate), KC₁₂H₂₃O₂ (potassium laurate), K₂C₄H₄O₅ (potassium malate), K₂CH₂(SO₃)₂ (potassium methionate),

2KCH₃SO₄·H₂O (potassium methyl sulfate), K₂C₁₀H₆(SO₃)₂·2H₂O (potassium naphthalene-1,5-disulfonate), KIBr₂ (potassium dibromoiodide), K₂SnBr₆, KCl·CaCl₂ (potassium calcium chloride), K₂C₁₀H₁₄O₄·5H₂O (potassium d-camphorate), K₂CO₃ (potassium carbonate), K₂CO₃·xH₂O, KHCO₃ (potassium hydrogen carbonate), K₂C₂O₆ (potassium peroxycarbonate), (KCO)₆ (potassium carbonyl), KClO₃ (potassium chlorate), KClO₄ (potassium perchlorate), KCl, KClO, KICl₄ (potassium chloroiodate), KICl₂, K₂OSCl₆ (potassium chloroosmate), K₂RhCl₅ (potassium pentachlorohodite), K₂CrO₄ (potassium chromate), K₂Cr₂O₇ (potassium dichromate), K₃CrO₈ (potassium peroxychromate), KNO₃ (potassium nitrate), K₃N (potassium nitride), KNO₂ (potassium nitrite), KC₁₈H₃₃O₂ (potassium oleate), KC₁₈H₃₃O₂C₁₈H₃₄O₂ (potassium acid oleate), K₂OsO₄·2H₂O (potassium osmate), K₂C₂O₄·H₂O (potassium oxalate), KHC₂O₄ (potassium hydrogen oxalate), KHC₂O₄·½H₂O, KHC₂O₄·H₂O, KHC₂O₄·H₂C₂O₄·2H₂O, K₂O, K₂O₂, K₂O₃, KO₂

KC₆H₅SO₄

(potassium phenyl sulfate), K₃PO₄, K₂HPO₄,

K₄P₂O₇·3H₂O (potassium pyrophosphate), KPO₃.

The cesium ion source can be elemental cesium or a cesium compound. Examples not by way of limitation of cesium compounds include both organic and inorganic compounds such as CsC₂H₃O₂ (cesium acetate), CsAl(SO₄)₂·12H₂O (cesium aluminum sulfate), CsC₇H₅O₂ (cesium benzoate), CsBrO₃ (cesium bromate), CsBr (cesium monobromide), CsBr₃ (cesium tribromide), CsBrClI (cesium bromochloroiodide), CsIBr₂ (cesium dibromoiodide), CsI₂Br (cesium bromodiiodide), Cs₂CO₃ (cesium carbonate), CsHCO₃ (cesium carbonate hydrogen), CsClO₃ (cesium chlorate), CsClO₄ (cesium perchlorate), CsCl (cesium chloride), CsAuCl₄ (cesium chloroaurate), CsBr₂Cl (cesium chlorodibromide), CsBrCl₂ (cesium dichlorobromide), CsICl₂ (cesium dichloroiodide), Cs₂SnCl₆ (cesium chlorostannate), Cs₂CrO₄ (cesium chromate), CsCn (cesium cyanide), CsF (cesium fluoride), CsSiF₆ (cesium fluosilicate), CsCHO₂ (cesium formate), CsCHO·H₂O, CsH (cesium hydride), CsOH (cesium hydroxide), CsIO₃ (cesium iodate), CsIO₄ (cesium metaperiodate), CsI (cesium monoiodide), CsI₃ (cesium triiodide), CsI₅ (cesium pentaiodide), CsCl₅, CsBr₅, CsF₅, CsNO₃ (cesium nitrate), CsNO₃·HNO₃ (cesium hydrogen nitrate), CsNO₃·2HNO₃

(cesium dihydrogen nitrate), CsNo₂ (cesium nitrite), Cs₂C₂O₄ (cesium oxalate), Cs₂O (cesium monoxide), Cs₂O₂ (cesium peroxide), Cs₂O₃ (cesium trioxide), CsO₂ (cesium superoxide), CsHC₈H₄O₄ (cesium hydrogen phthalate), CsRh(SO₄)₂·12H₂O (cesium rhodium sulfate), CsC₇H₅O₃ (cesium salicylate), Cs₂SO₄ (cesium sulfate), CsHSO₄ (cesium hydrogen sulfate), Cs₂S·4H₂O (cesium sulfide), Cs₂S₂ (cesium disulfide), Cs₂S₂·H₂O, Cs₂S₃ (cesium tetrasulfide), Cs₂S₅ (cesium pentasulfide), Cs₂S₆ (cesium hexasulfide).

The rubidium ion source can be elemental rubidium or a rubidium compound. Examples not by way of limitation of rubidium compounds include both organic and inorganic compounds such as RbC₂H₃O₂ (rubidium acetate), RbAl(SO₄)₂·12H₂O (rubidium aluminum sulfate), RbBrO₃ (rubidium bromate), RbBr (rubidium bromide), RbBr₃ (rubidium tribromide), RbIBrCl (rubidium bromochloroiodide), RbIBr₂ (ribidium dibromoiodide), RbBrCl₂ (rubidium dichlorobromide), RbBr₂Cl (rubidium chlorodibromide), Rb₂CO₃ (rubidium carbonate), RbHCO₃, RbClO₃ (rubidium chlorate), RbClO₄ (rubidium perchlorate), RbCl (rubidium chloride), RbICl₂ (rubidium dichloroiodide), Rb₂CrO₄ (rubidium chromate), Rb₂Cr₂O₇ (rubidium dichromate), RbF (rubidium fluoride), Rb₂SiF₆ (rubidium fluosilicate), RbFSO₃ (rubidium fluosulfonate), RbH (rubidium hydride), RbOH (rubidium hydroxide), RbIO₃ (rubidium iodate), RbIO₄ (rubidium metaperiodate), RbI (rubidium iodide), RbI₃ (rubidium triiodide), RBI·4SO₂, RbMnO₄ (rubidium permanganate), RbNO₃ (rubidium nitrate), RbNO₃·HNO₃ (rubidium hydrogen nitrate), RbNO₃·2HNO₃, Rb₂O (rubidium monoxide), Rb₂O₃, Rb₄O₆ (rubidium trioxide), RbO₂ (rubidium superoxide), Rb₂SO₄ (rubidium sulfate), RbHSO₄ (rubidium hydrogen sulfate), Rb₂S (rubidium monosulfide), Rb₂S·4H₂O, Rb₂S₂ (rubidium disulfide), Rb₂S₃ (rubidium trisulfide), Rb$_2$S$_5$ (rubidium pentasulfide), Rb$_2$S$_6$ (rubidium hexasulfide), RbHC$_4$H$_4$O$_6$, Rb$_2$O$_2$ (rubidium peroxide).

The zinc ion source can be metallic zinc or a zinc compound. Examples not by way of limitation of zinc compounds include both organic and inorganic compounds such as Zn(C$_2$H$_3$O$_2$)$_2$ (zinc acetate), $$Zn(C_2H_3O_2)_2 \cdot 2H_2O$$

ZnAl$_2$O$_4$ (zinc aluminate), Zn(NH$_2$)$_2$ (zinc amide), Zn(C$_7$H$_5$O$_2$)$_2$ (zinc benzoate), 3ZnO·2B$_2$O$_3$ (zinc borate), Zn(BrO$_3$)$_2$·6H$_2$O (zinc bromate), ZnBr$_2$ (zinc bromide), Zn(C$_4$H$_7$O$_2$)$_2$·2H$_2$O (zinc butyrate), $$Zn(C_6H_{11}O_2)_2$$

(zinc caproate), ZnCO$_3$ (zinc carbonate), $$Zn(ClO_3)_2 \cdot 4H_2O$$

(zinc chlorate), ZnCl$_2$ (zinc chloride), ZnCrO$_4$ (zinc chromate), ZnCr$_2$O$_7$·3H$_2$O (zinc dichromate), $$Zn_3(C_6H_5O_7)_2 \cdot 2H_2O$$

(zinc citrate), Zn(CN)$_2$ (zinc cyanide), $$Zn(H_2O)_6GaF_5 \cdot 5H_2O$$

(zinc fluogallate), ZnF$_2$ (zinc fluoride), ZnSiF$_6$·6H$_2$O (zinc fluosilicate), Zn(HSO$_2$·CH$_2$O)$_2$, $$Zn(OH)HSO_2 \cdot CH_2O$$

(zinc formaldehydesulfoxylate), Zn(CHO$_2$)$_2$ (zinc formate), ZnC$_4$H$_4$O$_6$·H$_2$O, ZnC$_4$H$_4$O$_6$·2H$_2$O (zinc tartrate), Zn(SCN)$_2$ (zinc thiocyanate), Zn(C$_5$H$_9$O$_2$)$_2$·2H$_2$O (zinc valerate), [Zn(NH$_3$)$_2$]Cl$_2$ (zinc diaminezinc chloride), Zn(CH$_2$CH$_2$CH$_2$CH$_3$)$_2$ (zinc di-n-butylzinc), Zn(C$_2$H$_5$)$_2$ (zinc diethylzinc), Zn(CH$_3$)$_2$ (zinc dimethylzinc), Zn(C$_6$H$_5$)$_2$ (zinc dihpenylzinc), Zn(CH$_2$CH$_2$CH$_3$)$_2$ (zinc di-n-propylzinc), Zn(C$_6$H$_4$CH$_3$)$_2$ (zinc di-o-tolylzinc), Zn(CHO$_2$)$_2$·2H$_2$O (zinc formate), ZnGa$_2$O$_4$ (zinc gallate), ZnC$_3$H$_7$O$_6$P (zinc glycerophosphate), Zn(OH)$_2$ (zinc hydroxide), Zn(IO$_2$)$_2$ (zinc iodate), $$Zn(IO_2)_2 \cdot 2H_2O$$

ZnI$_2$ (zinc iodide), Zn(C$_3$H$_3$O$_2$)$_2$·3H$_2$O (zinc dl-lactate), Zn(C$_3$H$_3$O$_2$)$_2$·2H$_2$O (zinc d-lactate), Zn(C$_{11}$H$_{11}$O$_2$)$_2$ (zinc laurate), Zn(MnO$_4$)$_2$·8H$_2$O (zinc permanganate), Zn(NO$_3$)$_2$·3H$_2$O (zinc nitrate), ZnN$_2$ (zinc nitride), ZnO (zinc oxide), Zn(C$_4$H$_7$O$_2$)$_2$ (zinc acelylacetonate), Zn(C$_4$H$_5$O$_4$)$_2$ (zinc 1-phenol-4-sulfonate), Zn$_3$(PO$_4$)$_2$ (zinc ortho phosphate), Zn$_3$(PO$_4$)$_2$·4H$_2$O, $$Zn_3(PO_4)_2 \cdot 8H_2O$$

Zn$_3$(PO$_4$)$_2$·2H$_2$O, Zn$_2$P$_2$O$_7$ (zinc pyrophosphate) Zn$_2$P$_2$ (zinc phosphide), Zn(H$_2$PO$_2$)$_2$·H$_2$O (zinc hypophosphite), zinc picrate, Zn(C$_7$H$_5$O$_3$)$_2$·3H$_2$O (zinc salicylate), ZnSeO$_4$·5H$_2$O (zinc selenate), ZnC$_2$O$_4$·2H$_2$O, ZnC$_2$O$_4$ (zinc oxalate), zinc oleate, ZnSiO$_2$ (zinc metasilicate), zinc stearate, ZnSO$_4$ (zinc sulfate), hydrates of zinc sulfate, ZnS, ZnS·H$_2$O, ZnSO$_2$ (zinc sulfite).

The following are typical examples:

Example I

A burner having the configuration of burner B in FIGURE 3 was employed in conjunction with reaction chamber A' of FIGURE 1.

Titanium tetrachloride (TiCl$_4$) at 1000° C. and 14.7 pounds per square inch absolute pressure was flowed at the rate of 80 millimoles per minute through annulus 17 into reaction zone 30. The TiCl$_4$ contained 3 mole percent of aluminum trichloride (AlCl$_3$), basis the TiCl$_4$.

Simultaneously, oxygen at 1000° C. and 14.7 pounds per square inch absolute pressure was flowed at 96 millimoles per minute through pagssage 15 (tube 12) into the reaction zone 30.

A 40 mole percent chlorine shroud (basis (TiCl$_4$) at 1000° C. and 14.7 pounds per square inch absolute pressure was flowed through annulus 16.

The reaction zone 30 was preheated and maintained at 1000° C.

Varying amounts of SiCl$_4$ were added to the TiCl$_4$ and varying amounts of KCl were added to the oxygen stream.

The results are tabulated in Table I. The SiCl$_4$ added to the TiCl$_4$ and the KCl added to the O$_2$ are expressed in mole percent, basis TiCl$_4$.

TABLE I

| Run No. | SiCl$_4$ in TiCl$_4$ | KCl in O$_2$ | Tinting Strength, TiO$_2$ | Undertone, TiO$_2$ |
|---|---|---|---|---|
| 1 | None | None | 1,500 | Brown 10. |
| 2 | 0.13 | None | 1,630 | Brown 4. |
| 3 | 0.27 | None | 1,590 | Do. |
| 4 | None | 0.006 | 1,500 | Brown 2. |
| 5 | None | 0.02 | 1,420 | Do. |
| 6 | None | 0.02 | 1,510 | Brown 1. |
| 7 | None | 0.04 | 1,560 | Do. |
| 8 | None | 0.04 | 1,530 | Brown 2. |
| 9 | 0.13 | 0.006 | 1,600 | Blue 4. |
| 10 | 0.27 | 0.003 | 1,670 | Neutral. |
| 11 | 0.27 | 0.004 | 1,640 | Blue 2. |
| 12 | 0.27 | 0.006 | 1,580 | Blue 4. |

Example II

The process operation conditions of Example I were repeated. The addition of SiCl$_4$ to the reaction zone 30 was constant, 0.27 mole percent, basis TiCl$_4$.

Different ions (anions) were added to the reaction zone with the SiCl$_4$ feeding an atomized aqueous chloride solution of each ion. The results are shown in Table II.

TABLE II

| Run No. | Added Anion | Atomized Chloride Solution, grams per liter | Tinting Strength | Undertone |
|---|---|---|---|---|
| 1 | K | 200 (KCl) | 1,580 | Blue 4. |
| 2 | Cs | 200 (CsCl) | 1,610 | Blue 3. |
| 3 | Zn | 200 (ZnCl) | 1,670 | Brown 1. |
| 4 | Na | 200 (NaCl) | 1,610 | Brown 5. |
| 5 | Ce | 200 (CeCl$_3$) | 1,630 | Brown 2. |
| 6 | Ce | 400 (CeCl$_3$) | 1,640 | Brown 5. |
| 7 | Li | 200 (LiCl) | 1,690 | Do. |
| 8 | Ba | 200 (BaCl$_2$) | 1,630 | Brown 4. |
| 9 | Sr | 200 (SrCl$_2$) | 1,650 | Brown 3. |
| 10 | None | None | 1,610 | Brown 4. |
| 11 | do | do | 1,650 | Brown 2. |

The results summarized in Table II illustrate the effect on undertone when a selected ion, e.g., K, Cs, or Zn, is added to the reaction zone with a silicon source. (Note Runs 1 to 3).

However, when other selected ions of the Group I–A alkali metals, e.g., Na, Li, or ions of Group II–A, e.g., Ba or Sr, are added with the same silicon source (Runs 4 to 9), there is no apparent effect on Undertone when compared with Runs 10 and 11 where no anions are added.

The tinting strength of pigmentary titanium dioxide may be determined by any of several methods known in the paint industry. One such method is the Reynold's Blue Method, A.S.T.M. D–332–26, "1949 Book of A.S.T.M. Standards," Part 4, page 31, published by American Society for Testing Material, Philadelphia, Pa.

Tint tone or undertone of a titanium dioxide pigment sample is determined by visually comparing a paste of the pigment with a paste of a selected standard.

In Examples I and II hereinbefore, a paste of each sample and standard was prepared in accordance with A.S.T.M. D–332–36 using carbon black to tint each sample paste to the same depth of grey as the standard.

The standard used in the Examples I and II has an oil absorption rating of 20.9 as determined by A.S.T.M. D–281–31, an average particle size of 0.25 micron as determined with an electron micrograph, and an assigned undertone value of Blue 2.

The samples obtained in Examples I and II were compared with the standard and an undertone value assigned to the sample by stating whether the sample was bluer or browner than the designated standard.

The more blue a pigment is, the more pleasing are the optical properties of a paint prepared from the pigment.

Conversely, the more brown the pigment, the less pleasing the optical properties of the paint.

The undertone scale used herein ranges from a Brown 10 to a Blue 6 as shown hereinafter in Table III.

TABLE III

| | |
|---|---|
| Brown | 10 |
| Do | 9 |
| Do | 8 |
| Do | 7 |
| Do | 6 |
| Do | 5 |
| Do | 4 |
| Do | 3 |
| Do | 2 |
| Do | 1 |
| Neutral | |
| Blue | 1 |
| Blue (Standard) | 2 |
| Blue | 3 |
| Do | 4 |
| Do | 5 |
| Do | 6 |

While the invention has been described by reference to specific details of certain embodiments, it is not intended that the invention be construed as limited to such details except insofar as they appear in the appended claims.

I claim:

1. In a process for preparing pigmentary titanium dioxide by vapor phase oxidation of titanium tetrahalide selected from the group consisting of titanium tetrachloride, titanium tetrabromide and titanium tetraiodide with oxygenating gas, the invention which comprises improving the optical properties of titanium dioxide so produced by conducting said oxidation in the presence of an added source of silicon and a separate added source of a member selected from the group consisting of potassium, rubidium and cesium.

2. A process according to claim 1 wherein the source of silicon is selected from the group consisting of metallic silicon and a silicon halide.

3. A process according to claim 1 wherein the source of silicon is present in an amount which, when oxidized, is sufficient to form from 0.01 to 8.0 weight percent silicon dioxide, based on titanium dioxide.

4. A process according to claim 1 wherein from 0.00001 to 4 weight percent, based on titanium dioxide, of a member selected from the group consisting of potassium, rubidium and cesium is present.

5. A process according to claim 1 wherein the source of silicon is a silicon halide and the source of potassium is a potassium halide.

6. In a process for preparing pigmentary titanium dioxide by vapor phase oxidation of titanium tetrachloride with oxygenating gas, the improvement which comprises conducting said oxidation in the presence of an added source of silicon which, when oxidized, is sufficient to form from 0.01 to 8.0 weight percent silicon dioxide, based on titanium dioxide, and in the presence of a separate added source of a member selected from the group consisting of potassium, rubidium and cesium which is sufficient to provide from 0.00001 to 4 weight percent, based on titanium dioxide, of said member.

7. In a process for preparing pigmentary titanium dioxide by vapor phase oxidation of titanium tetrachloride with oxygenating gas, the improvement which comprises conducting said oxidation in the presence of a silicon halide and a source of potassium, said silicon halide being present in an amount, which, when oxidized, is sufficient to form from 0.01 to 8.0 weight percent silicon dioxide, based on titanium dioxide, and said potassium source being present in an amount sufficient to provide from 0.00001 to 4 weight percent, based on titanium dioxide, of potassium.

8. In a process for preparing pigmentary titanium dioxide by vapor phase oxidation of titanium tetrahalide selected from the group consisting of titanium tetrachloride, titanium tetrabromide and titanium tetraiodide in a reaction zone, the invention which comprises improving the optical properties of titanium dioxide so produced by introducing a source of silicon and a separate source of potassium into said reaction zone.

9. A process according to claim 8 wherein said source of silicon is introduced in an amount which, when oxidized, is sufficient to form from 0.01 to 8.0 weight percent silicon dioxide, based on titanium dioxide, and wherein said potassium source is introduced in an amount sufficient to provide from 0.00001 to 4 weight percent potassium, based on titanium dioxide.

10. A process according to claim 8 wherein said source of silicon is silicon tetrachloride and wherein said source of potassium is potassium chloride.

11. In a process for preparing pigmentary titanium dioxide by vapor phase oxidation of titanium tetrachloride with oxygenating gas, the improvement which comprises conducting said oxidation in the presence of silicon tetrachloride and potassium chloride, said silicon tetrachloride being present in an amount sufficient to form from 0.01 to 8.0 weight percent silicon dioxide, based on titanium dioxide, and said potassium chloride being present in an amount sufficient to provide from 0.00001 to 4 weight percent potassium ion, based on titanium dioxide.

References Cited

UNITED STATES PATENTS 3,208,866  9/1965  Lewis et al. _____ 23—202 XR
3,068,113  12/1962  Strain et al. _____ 106—300

EDWARD STERN, *Primary Examiner.*

U.S. Cl. X.R.

106—300